United States Patent
Suryanarayana et al.

(10) Patent No.: US 12,443,415 B2
(45) Date of Patent: Oct. 14, 2025

(54) SILICON-AGNOSTIC SENSOR HUB ABSTRACTION

(71) Applicant: Dell Products L.P., Round Rock, TX (US)

(72) Inventors: Shekar Babu Suryanarayana, Bangalore (IN); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 194 days.

(21) Appl. No.: 18/307,010

(22) Filed: Apr. 26, 2023

(65) Prior Publication Data
US 2024/0362028 A1  Oct. 31, 2024

(51) Int. Cl.
*G06F 9/4401* (2018.01)
(52) U.S. Cl.
CPC ................... *G06F 9/4403* (2013.01)
(58) Field of Classification Search
CPC ..... G06F 9/4403; G06F 9/4401; G06F 9/4411
See application file for complete search history.

(56) References Cited

U.S. PATENT DOCUMENTS

| | | | |
|---|---|---|---|
| 10,402,454 B1* | 9/2019 | Shchygel | G06F 16/90335 |
| 2006/0168576 A1* | 7/2006 | Phung | G06F 8/65 717/168 |
| 2017/0364683 A1* | 12/2017 | Willden | G06F 12/14 |
| 2020/0372156 A1* | 11/2020 | Sayyed | G06F 21/577 |
| 2023/0325202 A1* | 10/2023 | Edwards, III | G06F 9/4411 713/1 |

* cited by examiner

*Primary Examiner* — Glenn A. Auve
(74) *Attorney, Agent, or Firm* — Jackson Walker L.L.P.

(57) ABSTRACT

Methods and system disclosed herein provide secure sensor hub enumerations to support native sensor behavior that is vulnerability free and does not permit sensor behavior overrides. In addition, disclosed subject matter enables a firmware protocol to dynamically sense vendor attributes and enumerate a unified layer that handles multiple tailored sensor hub APIs to run seamless sensor operations across various chipset vendors and to enable sensor attribute reset without a need for factory defaults. Disclosed methods may create an abstracted firmware map used to dynamically generate a runtime sensor memory map that is independent of silicon vendor to abstract the flash payload with sensor HID attribute objects.

20 Claims, 4 Drawing Sheets

SILICON-AGNOSTIC SENSOR HUB ABSTRACTION

TECHNICAL FIELD

The present disclosure pertains to information handling systems and, more specifically, managing vendor-specific implementation distinctions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems, which may be referred to herein simply as platforms for the sake of brevity, employ one or more sensors, including devices that detect events or changes in their environments and send information reporting detected events or changes to another device or resource.

Examples of common information handling system sensors include, without limitation, accelerometers, ambient light sensors, ambient temperature sensors, atmospheric pressure sensors, magnetometer/compass sensors, device orientation sensors, gyroscopes, humidity sensors, inclinometers, presence sensors, and proximity sensors. For purposes of communicating with an operating system (OS), such as a Windows OS from Microsoft, a sensor may be treated as a type of human interface device (HID) and the platform may include native support for a sensor HID Class driver.

Central processing unit (CPU) and chipset manufacturers, referred to herein simply as silicon vendors have developed sensor hubs for communicating and managing a platform's sensor resources. Such sensor hubs, including Intel's Integrated Sensor Hub (ISH) and AMD's Sensor Fusion Hub (SFH) may be enabled by and tightly coupled to vendor-specific sensor hub drivers as well as the underlying silicon fabric. Sensor hub drivers may override generic HID sensor attributes resulting in reported conflicts and errors that, in at least some cases, require a factory reset for resolution. Similarly, firmware payloads and memory maps may be generated specific to each silicon vendor based on the vendor-specific sensor hub implementation and there is no common uniform extensible firmware interface (UEFI) protocol to abstract the flash payload with application programming interfaces (APIs).

SUMMARY

Recognizing that there is currently is no abstracted sensor hub enumeration at pre boot phase to achieve hub-agnostic sensor operations that are seamless across heterogeneous silicon vendor code, disclosed subject matter supports firmware to dynamically sense vendor information and implement a unified layer for handling multiple vendor-specific sensor hub APIs to run seamless sensor operations across chipset vendors.

Methods and system disclosed herein provide secure sensor hub enumerations to support native sensor behavior that is vulnerability free and does not permit sensor behavior overrides. In addition, disclosed subject matter enables a firmware protocol to dynamically sense vendor attributes and enumerate a new unified layer that handles multiple tailored sensor hub APIs to run seamless sensor operations across various chipset vendors and to enable sensor attribute reset without a need for factory defaults. Disclosed methods may create an abstracted firmware map used to dynamically generate a runtime sensor memory map that is independent of silicon vendor that abstracts the flash payload with sensor HID attribute objects.

Disclosed teachings offer an improved user experience by dynamically enumerating secure sensor operation allowing only genuine sensor behaviors. In addition, a unified layer provides two or more tailored sensor hub abstractions to run seamless sensor operations across various chipset vendors and enable sensor attribute reset. A runtime sensor memory map generates a chipset-independent abstracted firmware map for OS runtime sensor HID attribute objects.

Suitable use cases for disclosed subject matter include, as examples, Wake On Approach (WOA) Walk Away Lock (WAL), Keep Alive, also known as No Lock On Presence (NLOP), Look Away Detect (LAD) aka Adaptive Dimming, each of which needs secure dynamic enumeration of sensor hubs to avoid vulnerable overrides. Another suitable use case addresses issues in which, for example, an embedded controller (EC) triggers an incorrect update with vulnerable override sensor operation in tent, laptop, and tablet operating modes and redirects incorrect wireless radio behavior and/or display modes. Reported issues that may be resolved include a failure to detect lid open/close during entry to or exit from modern standby, escalation of privilege via local access to create sensor malfunctions due to incorrect default permissions in vendor specific sensor hub driver stack, and unintended disabling of screen rotation by vendor-specific sensor hub drivers.

In one aspect, methods and systems disclosed herein for booting a sensor-provisioned information handling system, prior to loading an operating system, execute a binding driver to provide a silicon-agnostic sensor hub binding protocol and perform a sensor hub enumeration in accordance with the sensor hub binding protocol to identify one or more sensor hubs of the information handling system. In at least some embodiments, the sensor hub enumeration may prohibit overrides of native sensor behavior. An interface of the silicon-agnostic sensor hub binding protocol may reference or include a start function configured to scan attached devices to identify a device path, wherein the device path is indicative of a device identifier, a vendor of the sensor hub, and a bus path.

For each identified sensor hub, a sensor hub plugin MAY BE selected and loaded to memory. The sensor hub plugin may generate, publish, or otherwise provide a plugin sensor protocol suitable for consumption by pre-boot applications for sensor enumeration. Each plugin sensor protocol may be configured to determine one or more silicon-specific attributes of the sensor hub and to support a corresponding sensor hub API. Each plugin sensor protocol may enable sensor attribute reset without requiring either a reboot or a factory default reset. The sensor hub enumeration may perform the sensor hub enumeration during a pre EFI execution (PEI) phase of a universal extensible firmware interface (UEFI) boot sequence. Disclosed methods may include passing a silicon-agnostic sensor hub enumeration hand off block (HOB) to a drive execution environment (DXE) to update a runtime memory map for use in a runtime execution environment.

The sensor hub plugin may enable communication to a sensor hub framework. The sensor hub may be coupled to an embedded controller (EC) via two general purpose I/O (GPIO) signals. In addition, a state of the two GPIO signals may indicate an operating mode of the information handling system. The supported operating modes of the information handling system may include a notebook operating mode, a tablet operating mode, and a tent operating mode.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
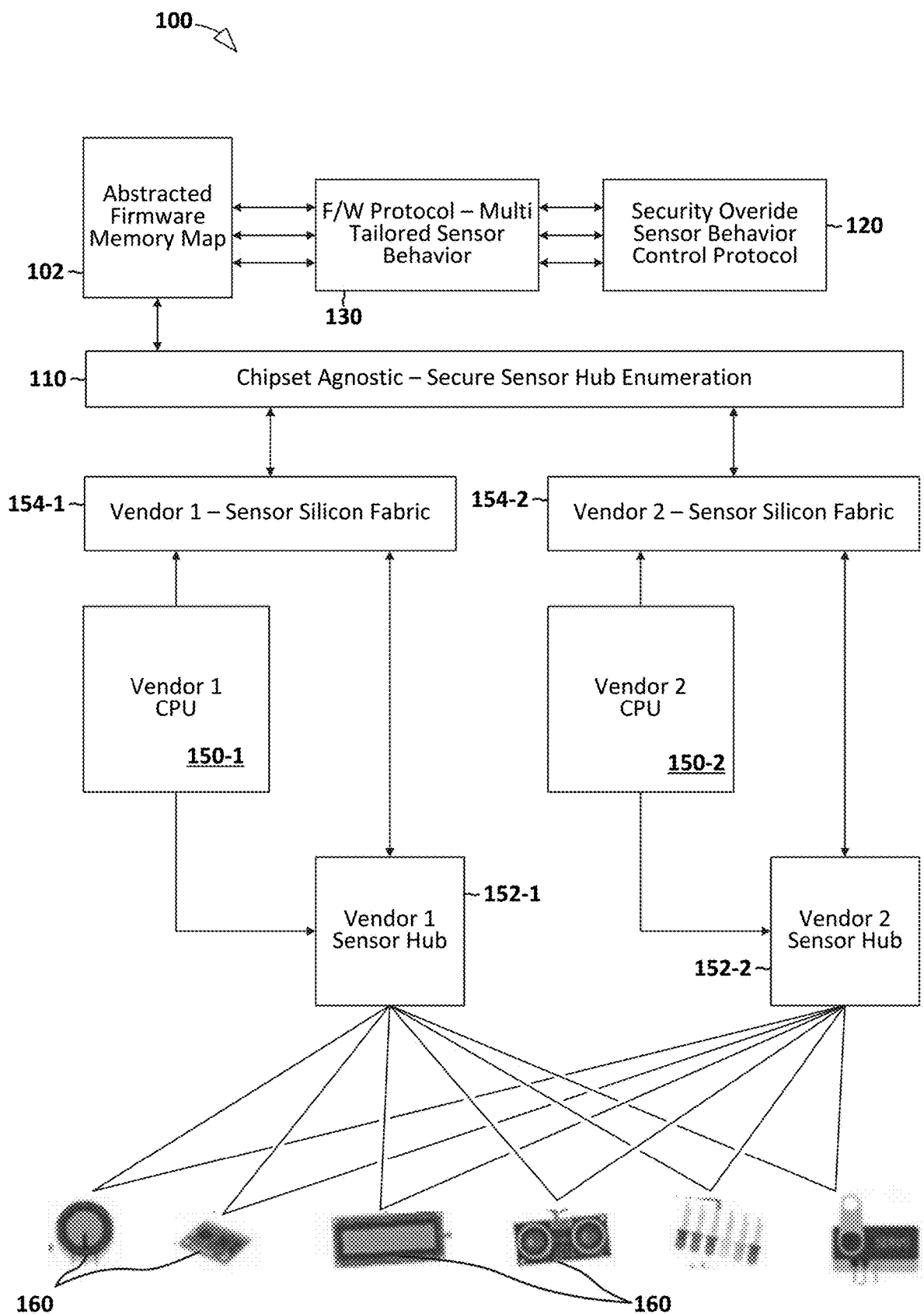
FIG. 1 illustrates an information handling system including supporting secure sensor hub enumerations.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary information handling system 100 including features and functionality enabling a secure sensor hub enumeration (110) to implement vendor-agnostic native sensor hub behavior that is invulnerable to being overwritten. For purposes of emphasizing aspects of disclosed features, the platform 100 depicted in FIG. 1, includes CPUs and sensor hubs from two different vendors. A first vendor CPU 150-1 is communicatively coupled between a first vendor sensor hub 152-1 and a first vendor 154-1 sensor silicon fabric. Similarly, a second vendor CPU 150-2 is communicatively coupled between a second vendor sensor hub 152-2 and a second sensor silicon fabric 154-2. Sensor hubs 152-1 and 152-2 are both communicatively coupled to the platform's sensor devices 160. It will be appreciated by those of ordinary skill, however, that other implementations may include system's with CPU and sensor hub hardware from a single vendor.

Support for vendor-specific sensor hub implementations is achieved via an abstracted firmware memory map 102 created, in at least some embodiments, during a pre-EFI initialization (PEI) phase, in conjunction with a memory reference code (MRC), of a boot sequence. A chipset-agnostic, secure sensor hub enumeration hand off block (HOB) is passed to a driver execution environment (DXE) phase of the boot sequence to update the runtime memory map for OS/EC functions.

Disclosed enumerations may further provide a security override 120 for any sensor behavior including a control protocol running on top of the enumerated layer. This layer results in an OS/EC/BIOS-centric API (UEFI Sensor Protocol) that is agnostic across silicon vendors, e.g., Intel, AMD, Qualcomm, etc.

A UEFI Sensor Firmware Protocol (USFP) 130 dynamically senses vendor attributes and enumerates a new unified layer that handles multiple tailored sensor hub APIs to run seamless sensor operations across various chipset vendors and enables sensor attribute resets without requiring factory defaults.

Abstracted firmware memory map 102 may dynamically generate a runtime sensor memory map, independent of silicon vendor, that abstracts the flash payload with sensor HID attribute objects.

Figure 2:
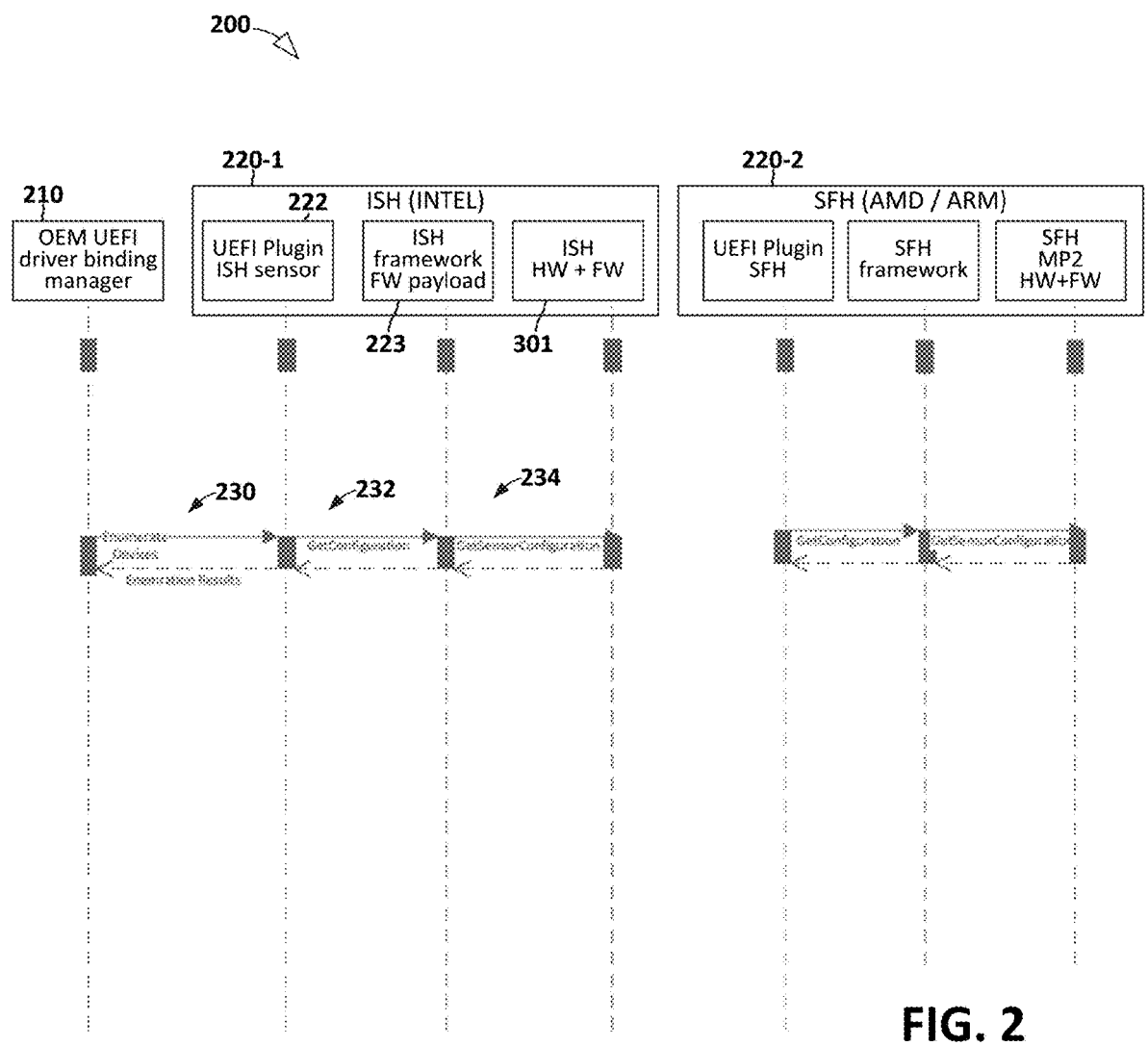
FIG. 2 a sequence diagram of an OEM UEFI manager binding driver interacting with two vendor specific sensor and sensor hub implementations.

Turning now to FIG. 2, a flow diagram illustrates a sensor hub enumeration sequence 200 in which a UEFI manager sensor binding driver (SBD) 210 of an information handling system original equipment manufacturer (OEM) produces a protocol with functionality for enumerating multiple heterogeneous sensor hubs 220. The sensor hubs 220 illustrated in FIG. 2 include an Intel-based Integrated Sensor Hub (ISH) 220-1 and an AMD-based Sensor Fusion Hub (SFH) 220-2. Other implementations may include more, fewer, and/or different sensor hubs.

In at least one embodiment, the SBD 210 of FIG. 2 produces, invokes, or otherwise provides a silicon-agnostic sensor hub binding protocol (SHBP). A structure definition for an exemplary SHBP follows:

```
typedef struct
_OEM_UEFI_SENSOR_HUB_BINDING_PROTOCOL
{
EFI_STATUS Supported;
EFI_STATUS Start;
EFI_STATUS Stop;
}
```

In this exemplary SHBP, the Supported callback( ) may be configured perform silicon-agnostic enumeration 230 of heterogeneous sensor hubs 220 to scan devices attached to the bus interface to read device paths. A device path contains information about devices attached to it including a device ID, a vendor ID, and bus path. The device path information may be used to identify sensor hubs attached to the bus interface.

Figure 3:
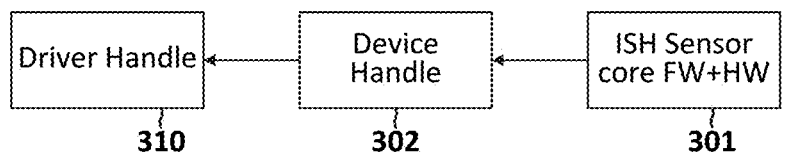
FIG. 3 illustrates the use of UEFI plugin, specific to a vendor sensor hub implementation, for producing protocols to be consumed by UEFI apps for sensor enumeration.

Within the exemplary SHBP, the Start callback( ) may call a ConnectSensorController( ) function and decide, based at least in part on the vendor ID and device ID, which sensor hub plugin to load into system memory. As an example, if the vendor and device ID information indicates an Intel X86 platform, a UEFI Plugin-ISH sensor 222 may be dispatched. As depicted in FIG. 3, this will create a driver handle 310 on an ISH device handle 302 corresponding to the ISH core firmware and hardware 301. UEFI plugin-ISH sensor 222 may act as a plugin wrapper to communicate (232) to ISH core framework 223.

UEFI Plugin ISH sensor 222 may produce a plugin sensor protocol to be consumed by UEFI apps for sensor enumeration (230). An exemplary structure definition for such a protocol follows:

```
typedef
struct _UEFI_PLUGIN_SENSOR_PROTOCOL
{
EFI_STATUS EnumerateDevices;
EFI_STATUS GetEnumerationResults
}
```

Each sensor hub 220 may be associated with a plugin 222 that acts as a wrapper to publish the protocol. UEFI dynamic enumeration enables a driver to detect and report changes to the number and type of devices connected to the system while the system is running. Based on this information, the plugin may dispatch the appropriate UEFI plugin driver into system memory and consume the protocol for performing the enumeration call.

The supported callback may employ bus drivers that use the dynamic enumeration at low level code of ISH sensor device attached to ISH sensor hardware.

Figure 4:
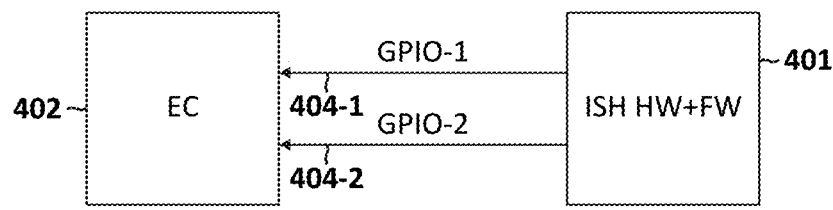
FIG. 4 illustrates a sensor hub communicating system operating mode information to an embedded controller via a pair of general purpose input/output (GPIO) signals.

FIG. 4 illustrates an ISH 401 connecting to an EC 402 with two GPIO signals 404-1 and 404-2. The state of GPIO signals 404 provides EC with information regarding a system operating mode. In one example, GPIO state may decode as follows:

```
00 notebook
01 Tent mode
11 tablet
```

In an exemplary flow for changing the mode, EC may read the GPIO to decide the current mode (e.g., tent or tablet). EC may then sends an SCI event to notify the host of the mode change. The Host (BIOS/OS) sends an ACPI EC command to retrieve the current mode (tent or tablet).

Figure 5:
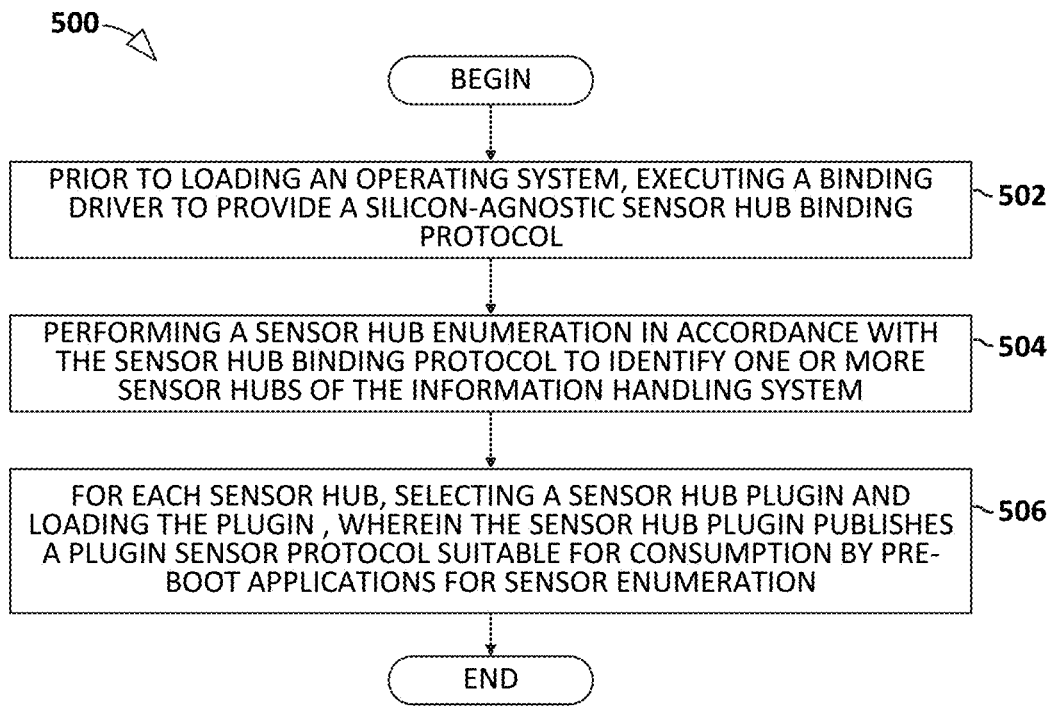
FIG. 5 illustrates a flow diagram of a method for booting an information handling system.

Referring now to FIG. 5, a flow diagram illustrates a sensor-aware method 500 for booting an information handling system. The method 500 illustrated in FIG. 5, prior to loading an operating system, executes (step 502) a binding driver suitable for publishing or otherwise providing a silicon-agnostic sensor hub binding protocol. A sensor hub enumeration is then performed (step 504) in accordance with the sensor hub binding protocol to identify one or more sensor hubs of the information handling system. For each of the one or more sensor hubs, a sensor hub plugin is selected (step 506) and loaded to memory. The sensor hub plugin publishes a plugin sensor protocol suitable for consumption by pre-boot applications for sensor enumeration.

Figure 6:
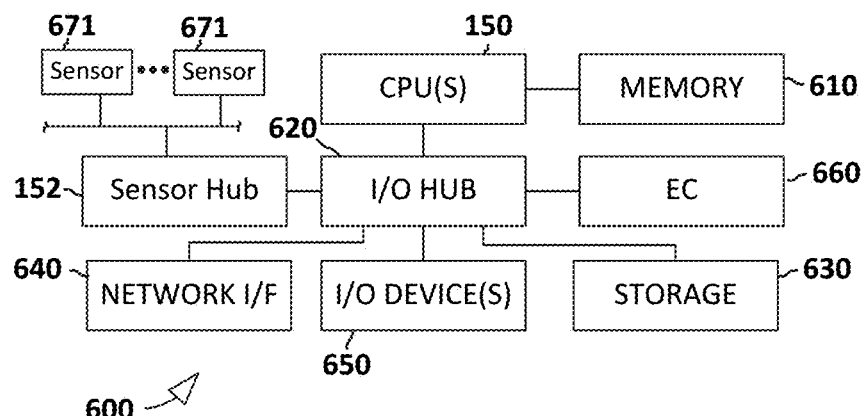
FIG. 6 illustrates an information handling system suitable for use in conjunction with the subject matter illustrated in FIGS. 1-5 and described in the accompanying text.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more CPUs 150 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc., and a sensor hub 152 coupled to one or more sensors 671.

The illustrated information handling system 600 includes an embedded controller EC 660 may provide or support various system management functions and, in at least some implementations, keyboard controller functions. Exemplary system management functions that may be supported by EC 660 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 660 may support battery management features to control charging of the battery in addition to switching between the battery and AC adapter as the active power source changes or monitoring the various battery status metrics such as temperature, charge level and overall health. EC 660 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for booting an information handling system, the method comprising:
    prior to loading an operating system, executing a binding driver to provide a silicon-agnostic sensor hub binding protocol;
    performing a sensor hub enumeration in accordance with the sensor hub binding protocol to identify one or more sensor hubs of the information handling system; and
    for each of the one or more sensor hubs, selecting a sensor hub plugin and loading the sensor hub plugin to memory, wherein the sensor hub plugin publishes a plugin sensor protocol suitable for consumption by pre-boot applications for sensor enumeration.

2. The method of claim 1, wherein the sensor hub enumeration prohibits overrides of native sensor behavior.

3. The method of claim 2, further comprising:
    passing a chipset agnostic sensor hub enumeration hand off block (HOB) to a drive execution environment (DXE) to update a runtime memory map for use in a runtime execution environment.

4. The method of claim 1, wherein each plugin sensor protocol is configured to:
    determine one or more silicon-specific attributes of the sensor hub; and
    support a corresponding sensor hub API.

5. The method of claim 4, wherein each plugin sensor protocol enables sensor attribute reset without requiring either a reboot or a factory default reset.

6. The method of claim 1, wherein performing the sensor hub enumeration comprises performing the sensor hub enumeration during a pre EFI execution (PEI) phase of a universal extensible firmware interface (UEFI) boot sequence.

7. The method of claim 1, wherein an interface of the silicon-agnostic sensor hub binding protocol includes a start function configured to scan attached devices to identify a device path, wherein the device path is indicative of a device identifier, a vendor of the sensor hub, and a bus path.

8. The method of claim 1, wherein the sensor hub plugin enables communication to a sensor hub framework.

9. The method of claim 1, wherein the sensor hub is coupled to an embedded controller (EC) via two general purpose I/O (GPIO) signals and wherein a state of the two GPIO signals indicates an operating mode of the information handling system.

10. The method of claim 9, wherein the operating mode of the information handling system is selected from: a notebook operating mode, a tablet operating mode, and a tent operating mode.

11. An information handling system, comprising:
a central processing unit (CPU);
a memory, accessible to the CPU, including processor-executable instructions that, when executed by the CPU, cause the system to perform operations including:
  prior to loading an operating system, executing a binding driver to provide a silicon-agnostic sensor hub binding protocol;
  performing a sensor hub enumeration in accordance with the sensor hub binding protocol to identify one or more sensor hubs of the information handling system;
  for each of the one or more sensor hubs, selecting a sensor hub plugin and loading the sensor hub plugin to memory, wherein the sensor hub plugin publishes a plugin sensor protocol suitable for consumption by pre-boot applications for sensor enumeration.

12. The information handling system of claim 11, wherein the sensor hub enumeration prohibits overrides of native sensor behavior.

13. The information handling system of claim 12, wherein the operations include:
  passing a chipset agnostic sensor hub enumeration hand off block (HOB) to a drive execution environment (DXE) to update a runtime memory map for use in a runtime execution environment.

14. The information handling system of claim 11, wherein each plugin sensor protocol is configured to:
  determine one or more silicon-specific attributes of the sensor hub; and
  support a corresponding sensor hub API.

15. The information handling system of claim 14, wherein each plugin sensor protocol enables sensor attribute reset without requiring either a reboot or a factory default reset.

16. The information handling system of claim 11, wherein performing the sensor hub enumeration comprises performing the sensor hub enumeration during a pre EFI execution (PEI) phase of a universal extensible firmware interface (UEFI) boot sequence.

17. The information handling system of claim 11, wherein an interface of the silicon-agnostic sensor hub binding protocol includes a start function configured to scan attached devices to identify a device path, wherein the device path is indicative of a device identifier, a vendor of the sensor hub, and a bus path.

18. The information handling system of claim 11, wherein the sensor hub plugin enables communication to a sensor hub framework.

19. The information handling system of claim 11, wherein the sensor hub is coupled to an embedded controller (EC) via two general purpose I/O (GPIO) signals and wherein a state of the two GPIO signals indicates an operating mode of the information handling system.

20. The information handling system of claim 19, wherein the operating mode of the information handling system is selected from: a notebook operating mode, a tablet operating mode, and a tent operating mode.

* * * * *